United States Patent [19]
Popio et al.

[11] Patent Number: 5,777,219
[45] Date of Patent: Jul. 7, 1998

[54] APPARATUS AND RELATED METHODS FOR AUTOMATICALLY TESTING AND ANALYZING TIRES UTILIZING A TEST POD WITH A SLIDABLY MOVABLE COVER PLATE AND A GRAY SCALE NORMALIZATION TECHNIQUE

[75] Inventors: James A. Popio, Mogadore; John L. Turner, Akron; Richard J. Macioce, Massillon; Wayne A. Indorf, Canton; Fu-Min Chen, Tallmadge; Stanley J. Olesky; Vladimir Roth, both of Akron, all of Ohio

[73] Assignee: Bridgestone/Firestone, Inc., Akron, Ohio

[21] Appl. No.: 729,358

[22] Filed: Oct. 16, 1996

[51] Int. Cl.⁶ ............................................ G01M 17/02
[52] U.S. Cl. ................................... 73/146; 356/71
[58] Field of Search ................ 73/146, 8; 356/71

[56] References Cited

U.S. PATENT DOCUMENTS

| | | | |
|---|---|---|---|
| 4,233,838 | 11/1980 | Stiebel | 73/146 |
| 4,434,652 | 3/1984 | Christie | 73/146 |
| 5,088,321 | 2/1992 | Kajikawa et al. | 73/146 |
| 5,092,166 | 3/1992 | Wada et al. | 73/146 |
| 5,245,867 | 9/1993 | Sube et al. | 73/146 |
| 5,249,460 | 10/1993 | Dory et al. | 73/146 |
| 5,313,827 | 5/1994 | Yovichin | 73/146 |
| 5,347,588 | 9/1994 | Wilson | 382/1 |
| 5,357,799 | 10/1994 | Roth et al. | 73/146 |

*Primary Examiner*—George M. Dombroske
*Assistant Examiner*—Joseph L. Felber
*Attorney, Agent, or Firm*—Carmen Santa Maria

[57] ABSTRACT

An apparatus and related methods for capturing a digital foot print image of a tire and for extrapolating load-deflection curves of the tire is presented. A frame carries a test pod that is coupled to a tire to perform various tests. In one application, a loading plate couples the tire to a transparent plate on the test pod where a camera captures a digital gray-scale image of the tire foot print. A processor converts the gray-scale image into a pressure map wherein each pixel of the digital image is correlated to a pressure value. In another application, the loading plate couples the tire to a sliding cover plate on the test pod, wherein the loading plate is incremented through a plurality of load values at predetermined inflation pressures. By using two inflation pressures, the processor extrapolates further load-deflection curves for the tire at other inflation pressures. The apparatus also provides a unique way for imparting camber on the tire during the above tests. The data collected from the foot print image and load-deflection curves may be used to analyze the construction, operation, noise generation characteristics and performance of the tire.

18 Claims, 5 Drawing Sheets

APPARATUS AND RELATED METHODS FOR AUTOMATICALLY TESTING AND ANALYZING TIRES UTILIZING A TEST POD WITH A SLIDABLY MOVABLE COVER PLATE AND A GRAY SCALE NORMALIZATION TECHNIQUE

TECHNICAL FIELD

The invention herein resides in the art of techniques and apparatus for testing pneumatic tires. More particularly, the invention relates to such methods and apparatus for performing both tire foot print tests and load-deflection tests, wherein the data collected from these tests is presented in several different formats. Specifically, the invention relates to such methods and apparatus for analyzing a tire by either capturing a digital image of the tire foot print or by extrapolating load-deflection curves of the tire.

BACKGROUND ART

In the manufacture of pneumatic tires, it is well known that many characteristics or features of a tire may impact its performance, wear, noise generation and the like. Various types of tests and analyses have been performed on tires to evaluate the aforementioned characteristics and features of the tire. For example, some tests monitor the actual physical operation of the tire as upon a rotating drum or the like. Analytical testing of external and cross-sectional features of the tire have also been undertaken. It is also known to analyze the contact patch or foot print of the tire as it makes contact with the road or loading surface to determine therefrom various structural and operational characteristics thereof. It is also known that load-deflection testing provides an indication of tire structural performance. It will be appreciated that in designing a pneumatic tire, numerous tests are undertaken prior to production of the tire to ensure a high quality performance tire. As such, a significant portion of the tire development design phase is devoted to testing and analyzing the new design. One example of foot print testing is disclosed in U.S. Pat. No. 5,347,588, entitled "Method And Apparatus For Video Imaging Of Tire Ground Contact Patch." This patent discloses an apparatus which employs video imaging of a tire foot print. The video image is filtered in such a manner that all of the picture elements or pixels are assigned either a black pixel value or a white pixel value. The pixel values are then employed to derive the total foot print area, the foot print contact area and the foot print void area. Additionally, other features, such as a contour or outline of the foot print image, can be derived.

Another example of tire testing is disclosed in U.S. Pat. No. 5,357,799, entitled "Method And Apparatus For Determining Abrasion Potential Of Tire Treads." This patent discloses an apparatus and technique for determining the abrasion potential of tire treads by capturing a video image of a tire as it is placed under a radial load. A plurality of markers are placed on the tire and a video image is generated as the tire is loaded and rotated between angular positions. The markers provide an indication of the frictional movement at the interface between the tire and support surface which corresponds to an indication of the propensity of the tire to wear. As in the previous disclosure, this disclosure employs a filtered video image to distinguish contact pressure and movement of the tire.

Tire testing machines are also known to generate load-deflection curves which are useful in predicting tire performance. As is well known, a load-deflection curve indicates how much a tire is deflected under a given load at a given inflation pressure. Prior art machines require that test data must be generated for five or more inflation pressures. Generating this load-deflection data is a time-consuming process that extends the time and cost of testing a tire.

Although the aforementioned inventions and tests are effective in accomplishing their desired objectives, it will be appreciated that these machines and other similar machines are usually only limited to performing one type of test on the tire. Moreover, these machines with video imaging capability do not fully utilize the video image of the foot print. Nor do any known machines additionally provide means for extrapolating load-deflection curves from at least two previously-generated load-deflection curves. Another consideration in testing tires is to determine what result imparting a camber to the tire has on the tire foot print and the load-deflective curves. By imparting a camber or tilt to the tire during loading, data regarding tire cornering capabilities and wear can be derived. Prior testing machines employed shims or other such rudimentary devices on or near the tire mounting fixture. These methods have been found to be labor intensive and difficult to control for the accurate testing of tires. Based upon the foregoing, there is a need in the art to provide an apparatus which performs a plurality of tests on tires at different repeatable camber angles at one station. Moreover, there is a need in the art for a machine which assists in providing quick and accurate information in the tire design phase, thereby bringing new tires to the market quicker and at much less cost.

DISCLOSURE OF INVENTION

In light of the foregoing, it is a first aspect of the present invention to provide an apparatus and related methods for performing a plurality of tests on tires.

Another aspect of the present invention is to provide an apparatus which includes a frame that slidably receives a test pod that is coupled with the tire to perform a plurality of tests.

Still a further aspect of the present invention, as set forth above, is to provide a tire spindle with the necessary mechanical linkage to impart a camber upon the tire during testing.

Still yet another aspect of the present invention, as set forth above, is to provide a motor connected to the tire spindle to selectively rotate the tire into various testing positions.

An additional aspect of the present invention, as set forth above, is to provide a load plate connected to the tire spindle to couple the tire to the test pod.

Still yet another aspect of the present invention, as set forth above, is to provide a load cell connected to the load plate to determine the amount of radial load imparted on the tire coupled to the test pod.

Yet a further aspect of the present invention, as set forth above, is to provide a deflection cell that monitors the amount of deflection of the tire as a load is imparted thereon. Still yet another aspect of the present invention, as set forth above, is to provide an inflation pressure source connected to the tire so that a plurality of inflation pressures can be provided to the tire as it is coupled to the test pod. Another aspect of the present invention, as set forth above, is to provide a processor which controls the various aforementioned components of the apparatus. Still another aspect of the present invention, as set forth above, is to provide the test pod with a transparent plate and a cover plate slidable thereover, wherein the transparent plate is employed to obtain foot print test data and the slidable cover plate is employed to obtain load-deflection data. Still yet another aspect of the present invention, as set forth above, is to provide camera within the test pod to capture a digital image of the tire coupled to the transparent plate.

An even further aspect of the present invention, as set forth above, is wherein the processor performs various tests on the digital image obtained by the camera.

Yet a further aspect of the present invention, as set forth above, is wherein the processor converts the digital image into a gray-scale image and employs a calibration operation to correlate the gray values to contact pressure values.

Still a further aspect of the present invention, as set forth above, is wherein the processor extrapolates load-deflection curves from at least two load-deflection curves generated when the tire is coupled to the test pod.

The foregoing and other aspects of the invention which shall become apparent as the detailed description proceeds are achieved by an apparatus for testing tires, comprising: a frame; a loading plate mounted within the frame; a tire spindle extending from the loading plate, the tire spindle rotatably receiving a tire to be tested; a test pod; and a processor for controlling the operation of the loading plate to couple the tire with the test pod, the processor connected to the test pod, wherein the processor and the test pod perform a plurality of tests on the tire.

Another aspect of the invention which will become apparent herein is obtained by an apparatus for testing tires, comprising: a frame having a pair of opposed slide tracks; a loading plate mounted within the frame; a tire spindle pivotably extending from the loading plate, the tire spindle receiving a tire to be tested; and a test pod slidably received on the pair of opposed slide tracks, the loading plate coupling the tire to the test pod to generate tire test data. Other aspects of the invention which will become apparent herein are obtained by a method for generating a tire foot print, comprising the steps of: providing a frame which receives a loading plate from which extends a tire spindle that receives a tire; coupling the tire to a transparent plate at a predetermined load level; capturing a grayscale image of the tire with a camera positioned underneath the transparent plate, the gray-scale image including an array of pixels, wherein each pixel in the array of pixels is assigned a gray level value; assigning a trial calibration factor; computing a trial load value with the predetermined load level, the gray level values and the trial calibration factor; computing an actual calibration factor with the trial calibration factor, the predetermined load level and the trial load level; and computing a corrected pixel pressure value for each pixel with the actual calibration factor.

Still other aspects of the invention which shall become apparent herein are obtained by a method for generating a plurality of load deflection curves, comprising the steps of: providing a frame which receives a loading plate from which extends a tire spindle that receives a tire; inflating the tire to a first predetermined inflation pressure value; deflecting the tire onto a cover plate to a predetermined load level; measuring a first deflection vs. load curve of the tire; unloading the tire from the plate; inflating the tire to a second predetermined inflation pressure value; deflecting the tire onto the cover plate to another predetermined load level; measuring a second deflection vs. load curve of the tire; and extrapolating deflection amounts of the tire at other inflation pressure values from the first and second deflection vs. load values.

BRIEF DESCRIPTION OF THE DRAWINGS

For a complete understanding of the objects, techniques and structure of the invention, reference should be made to the following detailed description and the accompanying drawings wherein.

BEST MODE FOR CARRYING OUT THE INVENTION

Figure 1:
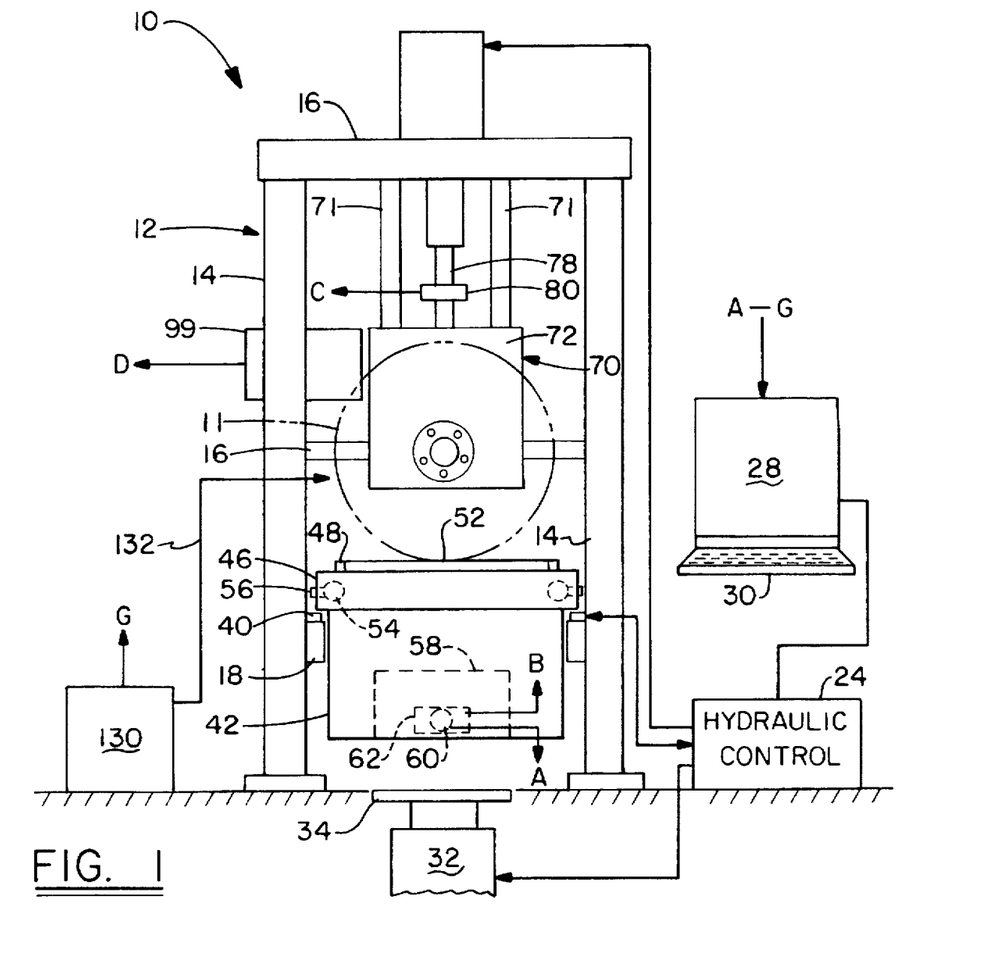
FIG. 1 is a schematic front view of the apparatus of the invention.
Figure 2:
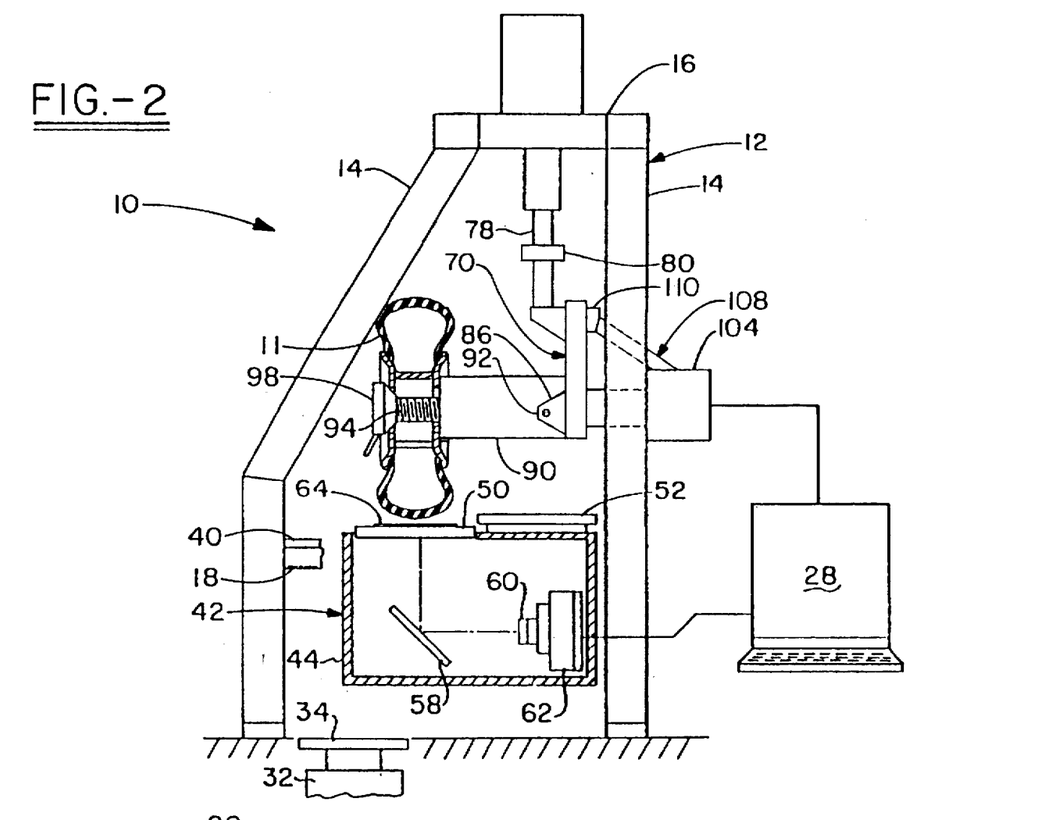
FIG. 2 is a schematic side view of the apparatus of the invention.

Referring now to the drawings and more particularly to FIGS. 1 and 2, it can be seen that an apparatus for automatically testing and analyzing tires is designated generally by the numeral 10. As shown schematically, a pneumatic tire 11 is carried by the apparatus 10 for providing at least a foot print image and load-deflection curves of the tire 11 which are employed to analyze the performance wear characteristics thereof. The tire 11 is carried by a frame 12 which includes a plurality of posts 14 that are vertically oriented and supported by a ground surface. A plurality of cross-pieces 16, which are horizontally oriented, interconnect the top of the posts 14. A pair of side bars 18 interconnect the posts 14 from front to back. Of course, other cross-pieces and bars may be included to structurally stabilize the frame 12. It will be appreciated that various components carried by the frame 12 are actuated and moved by a hydraulic control system 24. Of course, other actuatable control mechanisms may be employed to move components carried by the frame. In a similar manner, a processor 28 is connected to the hydraulic control system 24 and various data-gathering instruments carried by the frame 12. Those skilled in the art will appreciate that the processor 28 contains the necessary hardware, software and memory to control the operation of the apparatus 10 and to perform at least the tests performed on the tire 11 which will be discussed hereinbelow. Where appropriate, letter designations indicate the connection of the processor 28 to the appropriate component carried by the frame 12. A keyboard 30 is connected to the processor 28 and provides the necessary communication between an operator and the apparatus 10.

A hydraulic lift 32, which is connected to the hydraulic control system 24, is disposed below the ground surface. A lift plate 34, which is connected to the hydraulic lift 32, is normally provided at the same level as the ground surface. The lift plate 34 moves the tire 11 from a ground surface position to a position where it can be loaded onto the frame 12. Of course, other means may be employed to lift the tire 11 from the ground surface into the frame 12. A pair of opposed slide tracks 40 extend from the side bars 18 to carry a test pod 42. It will be appreciated that the test pod 42 is moved upon the slide tracks 40 by the hydraulic control system 24 and is also connected to the processor 28 for sending test data thereto. The test pod 42 includes a housing 44 from which extends a pair of rails 46 that ride on the slide tracks 40. As best seen in FIG. 2, the test pod 42 is movable toward the rear of the apparatus 10 a sufficient distance to allow clearance of the lift plate 34 when the tire 11 is to be loaded onto the frame 12. Upon completion of the loading of the tire 11 onto the frame 12, the test pod 42 is moved into a position underneath the tire 11. A pair of housing tracks 48 are disposed at the top lateral edges of the housing 44. A transparent plate 50 is carried by the housing 44 and is disposed etween the housing tracks 48. Although the transparent plate 50 can be made of any optically clear material, in the preferred embodiment the transparent plate 50 is made of glass. A cover plate 52, which is connected to a pneumatic control system (not shown), is received upon the housing tracks 48 and is movable to slide over the transparent plate 50 when desired. A pair of lights 54 are disposed near the lateral edges of the transparent plate 50 to provide a substantially constant illumination thereof. A pair of light sensors 56 are disposed near corresponding light sources 54 and are connected to a voltage regulator (not shown) to power the lights and maintain a desired illumination level. Those skilled in the art will appreciate that the light sensors 56 provide a feedback to the voltage regulator so that whenever the illumination level of the light sources 54 changes, appropriate corrective action is taken. This ensures that the foot print testing, to be described hereinbelow, is properly performed.

The housing 44 includes a mirror 58 which is disposed underneath the transparent plate 50 and is disposed at about a 45° angle. The mirror 58 reflects an image of the tire 11, which is coupled to the transparent plate 50, to a camera 60 which is connected to the processor 28. In the preferred embodiment, the camera 60 is a charge coupled device which provides an array of picture elements or pixels in a 640×480 array. The camera 60 generates a gray-scale image wherein each pixel represents a corresponding area of the tire foot print. The processor 28 receives for each pixel, an intensity value between gray levels of 0 (darkest) and 255 (brightest). This two-dimensional array of intensity values is stored in an image data file in the processor 28. Those skilled in the art will appreciate that a frame grabber board (not shown) is connected between the camera 60 and the processor 28 so that the proper image of the tire foot print is stored. The mirror 58 is employed to maximize the field of view of the camera 60. In other words, the structure of the housing 48 can be made more compact by employing the mirror 58 to transfer an image to the camera 60. It will also be appreciated that the camera 60 may include more than one camera to obtain the necessary field of view. For example, one camera, which has a 9"×12" field of view, is typically used to generate an image of a regular passenger tire. Alternatively, a wide-view camera, which can capture a 16"×20" field of view, may be employed to capture images of race tires. A camera mount 62 may carry either or both of the cameras 60 mentioned above. The camera mount 62 is movable in at least two axes to allow adjustment in the viewing angle of the cameras. Movement of the camera 60 facilitates finding the center of the foot print image.

To facilitate the generation of a gray-scale image of the tire foot print, a reflective paper 64, such as a photographic backing paper, or other medium is disposed on the transparent plate 50 prior to coupling the tire 11 thereto. Those skilled in the art will appreciate that the medium 64 functions as a reflective surface which provides for the generation of internal reflection light when a force is applied to the transparent plate 50. In particular, the foot print of the tire 11 is apparent through the internal reflection light generated when the tire 11 is forcefully loaded upon the reflective paper 64 against the illuminated transparent plate 50. If desired, a video cassette recorder (not shown) may be connected to the camera 60 for storage of the foot print image for later analysis.

Figure 3:
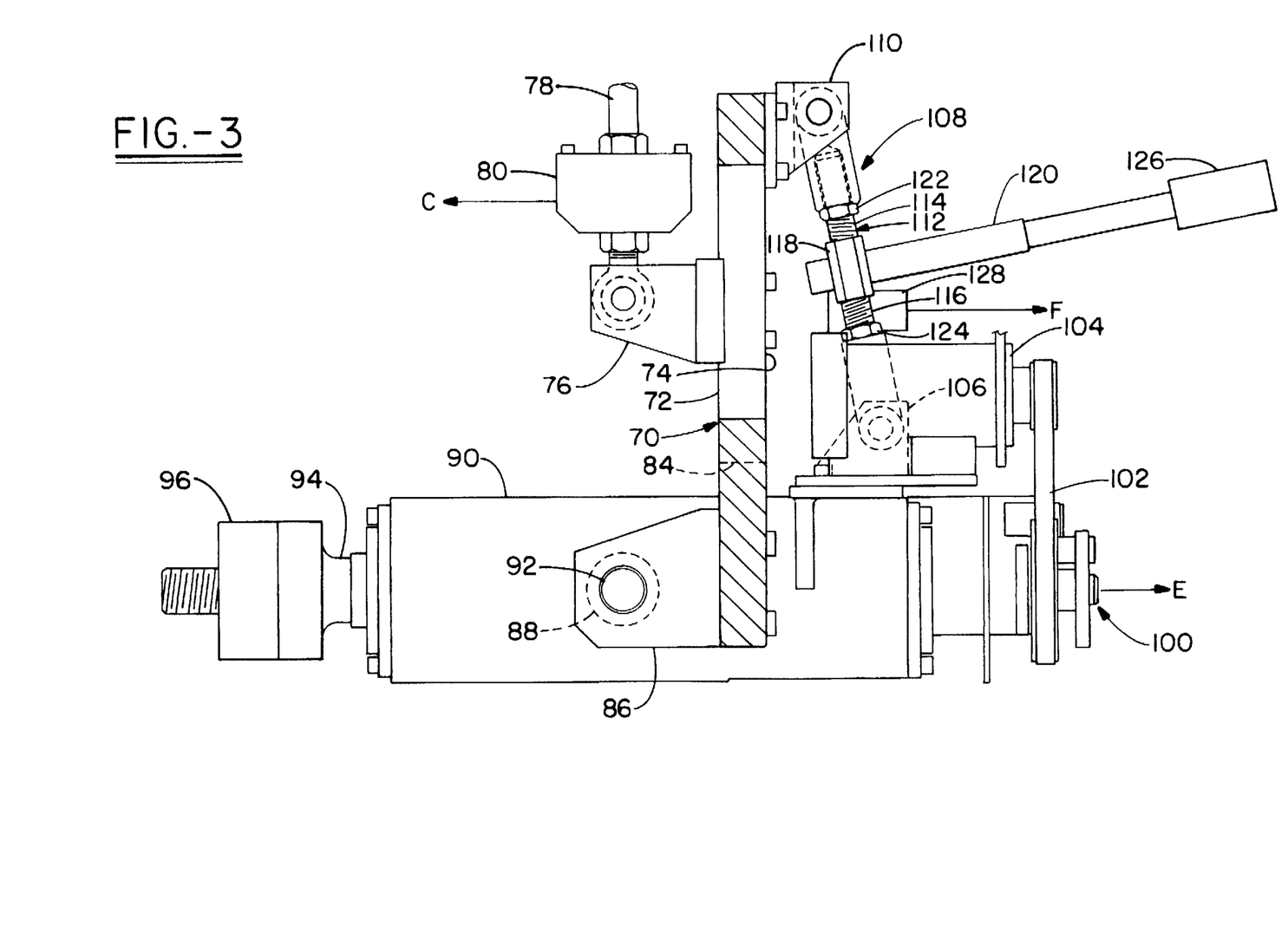
FIG. 3 is a partial cross-sectional view of a load plate and a tire spindle which carries a tire and the mechanism for imparting a camber thereto.

Referring now to FIGS. 1 through 3, a loading plate 70 is slidable on a pair of guide bars 71 that extend downwardly from the cross-piece 16. The loading plate 70 can provide a load force of up to about 5000 pounds and has at least a 22-inch range of motion. The loading plate has a front side 72 which faces the tire 11 and a rear side 74 which opposes the front side 72. A piston mount 76 extends from the front side 72 and interconnects the load plate 70 to a load piston 78. The load piston 78 is actuated by the hydraulic control system 24. A load cell 80, which is connected to the processor 28, is positioned on the load piston 78 to accurately provide data which indicates the amount of load applied to the tire 11. The loading plate 70 includes a notch 84 near the bottom thereof. A pair of opposed camber mounts 86 extend from the front side 72 with the notch 84 therebetween. A bushing 88 is provided in each of the camber mounts 86. A spindle housing 90 is carried by the camber mounts 86 and is received within the notch 84. A pair of camber pins 92 extend outwardly from the spindle housing 90 and are correspondingly received in each of the bushings 88 and pivot thereabout. A spindle 94 is rotatably received in the spindle housing 90. A tire mount 96 is located at one end of the spindle 94 and receives the tire 11. A chuck 98 secures the tire 11 to the tire mount 96 during testing. A deflection cell 99 is coupled to the loading plate 70 in a manner well known in the art to measure the amount of deflection thereof during loading. An encoder 100, which is connected to the processor 28, is also coupled to the spindle 94 for monitoring the rotation thereof. A drive assembly 102, which is connected to an electric motor 104, is mounted on the spindle housing 90 and is connected to the spindle 94 to control the rotation thereof. The motor 104 may be actuated by the hydraulic control system 24 or other electric power source. A housing mount 106 extends from the spindle housing 90 and is connected to a turnbuckle 108 which is connected at its opposite end to a plate mount 110 which extends from the rear side 74 of the loading plate 70. The turnbuckle 108 includes a threaded rod 112 which has a plurality of left-hand threads 114 at the end near the plate mount 110 and a plurality of right-hand threads 116 at the end of the threaded rod 112 near the housing mount 106. A hex member 118 is disposed between the left-hand threads 114 and the right-hand threads 116 and is connected to a ratchet 120. A lock nut 122 is disposed on the left-hand threads 114 while a lock nut 124 is disposed on the right-hand threads 116. A reversing knob 126 is disposed at the end of the ratchet 120 opposite the hex member 118. Those skilled in the art will appreciate that the lock nuts 122 and 124 are loosened and the ratchet 120 is pivoted to expand or retract the turnbuckle 108 between the plate mount 110 and the housing mount 106. Accordingly, as the ratchet 120 is pivoted or stroked, a camber is imparted on the spindle 94. This allows the tire 11 mounted to the spindle 94 to have a camber imparted thereto. An angle inclinometer 128 may be coupled to the motor 104, spindle housing 90 or connected attachments to determine the amount of camber imparted by the ratchet 120. These angle readings may be provided to the processor 28. Upon attaining the desired camber angle, the lock nuts 122 and 124 are tightened to hold the spindle housing 90 in place. In the preferred embodiment, the turnbuckle 108 and associated linkage can impart a range of tire camber angles of about ±6°. It will be appreciated that different camber angles generate different tire foot prints when the tire 11 is coupled to the transparent plate 50.

Moreover, these different tire foot print test patterns can provide insight into how the tire may perform during use, such as in wear. A pressurized air supply 130 is connected to the processor 28. A flexible hose 132 is connected between the pressurized air supply 130 and the tire 11 to provide a monitored air pressure to the tire. As will be described in further detail, the tire 11 is inflated by the pressurized air supply 130 to obtain the load-deflection curves. In use, the tire 11 is rolled onto the lift plate 34, whereupon the hydraulic lift 32 positions the tire 11 so that it can be easily positioned onto the tire mount 96. The operator then tightens the chuck 98 onto the tire mount 96 to secure the tire 11 to the spindle 94. The lift plate 34 is retracted to the ground surface and the test pod 42 is positioned underneath the tire 11. To perform the foot print testing on the tire 11, the cover plate 52 is retracted on the housing tracks 48 to expose the transparent plate 50 to the tire 11. The light sources 54 within the housing 44 are illuminated and the medium 64 is placed over the transparent plate 50. The tire 11 is inflated to a predetermined pressure by the air supply 130, whereupon the loading plate 70 is lowered to couple the tire 11 to the test pod 42. Upon loading, the camera 60 captures a gray-scale digital image of the tire foot print imparted on the medium 64. This tire foot print image is captured by the processor 28, whereupon the testing analysis is performed. If desired, prior to the loading of the tire 11 onto the transparent plate 50, the spindle housing 90 may be imparted with a desired camber angle as described above. Once the foot print image of the tire 11 is obtained, the loading plate 70 lifts the spindle housing 90. If desired, the motor 104 engages the drive assembly 102 and rotates the spindle 94 a predetermined amount. Typically, the tire 11 is rotated in about 120° increments to obtain three tire foot prints from a single tire. Upon completion of the rotation of the tire 11, the loading plate 70 is re-coupled with the test pod 42.

When it is desired to perform load-deflection testing on the tire 11, the processor 28 and the hydraulic control system 24 position the cover plate 52 over the transparent plate 50. The loading plate 70 is lowered and the tire 11 is coupled to the test pod 42. Once the tire 11 is coupled to the test pod at a minimal load value of about 250 pounds, the deflection cell 99 measures the deflection of the tire 11 and transmits this data to the processor 28. Afterwards, the processor instructs the loading plate 70 to step through various increments of radial load forces and measures the corresponding deflection measurements provided by the deflection cell 99. Upon reaching a maximum load level, the processor 28 instructs the hydraulic control system 24 to release the loading plate 70 and the tire is de-coupled from the test pod 42. At this time, the processor 28 increases the tire inflation pressure and the above deflection data is collected for that particular inflation pressure.

From the foregoing description of the operation of the apparatus 10, it will be appreciated that the data collected from the foot print testing and the load-deflection testing can be used to provide various testing analyses. For example, a foot print shape analysis can be generated to automatically analyze several geometric attributes of the tire foot print. The gray-scale image generated by the camera 60 is analyzed to determine the foot print contact area, the void area (non-contacting area within the foot print perimeter), foot print width and foot print length at various locations across the foot print. These parameters are used in evaluating tire performance with respect to wet and dry traction, tread wear and handling. The gray-scale image can also be manipulated to provide a foot print pressure mapping. The processor 28 converts the gray level intensity values over the foot print to contact pressure values. This yields a high spatial resolution of 640×480 pressure sensitive locations to map the foot print pressure distributions. This pressure data may be converted to a colorized display "map" showing contact pressure changes as color variations in a computer-generated picture of the foot print. The foot print pressure mapping can then be utilized to identify locations of non-uniformities or pressure disturbances that can impact tire wear, ride or handling properties. The foot print pressure map can be further analyzed for pressure variations (gradients) across lugs and ribs of the tire that specifically correlate to irregular wear performance. This analysis is beneficial because of the high spatial resolution and instantaneous data collection attributes provided by the apparatus 10. This feature is advantageous over the prior art in that traditional pressure measurement methods utilized a pressure probe imbedded in the ground and required multiple tire loadings to sample numerous locations of the foot print which were ill-suited to calculate pressure gradient values.

By employing the cover plate 52 in the testing of the tire 11, radial load-deflection curves can also be derived. By employing an automated process, only two deflection-curve readings are required to forecast other load-deflection curves at other inflation pressures. This data can then be employed to determine a tire radial stiffness which is employed to evaluate tire dynamic and vibrational behavior.

It should now be readily apparent that the apparatus and methods just described are capable of obtaining foot print image data and load-deflection data to improve the accuracy and evaluation of a tire during its design phase.

Figure 4:
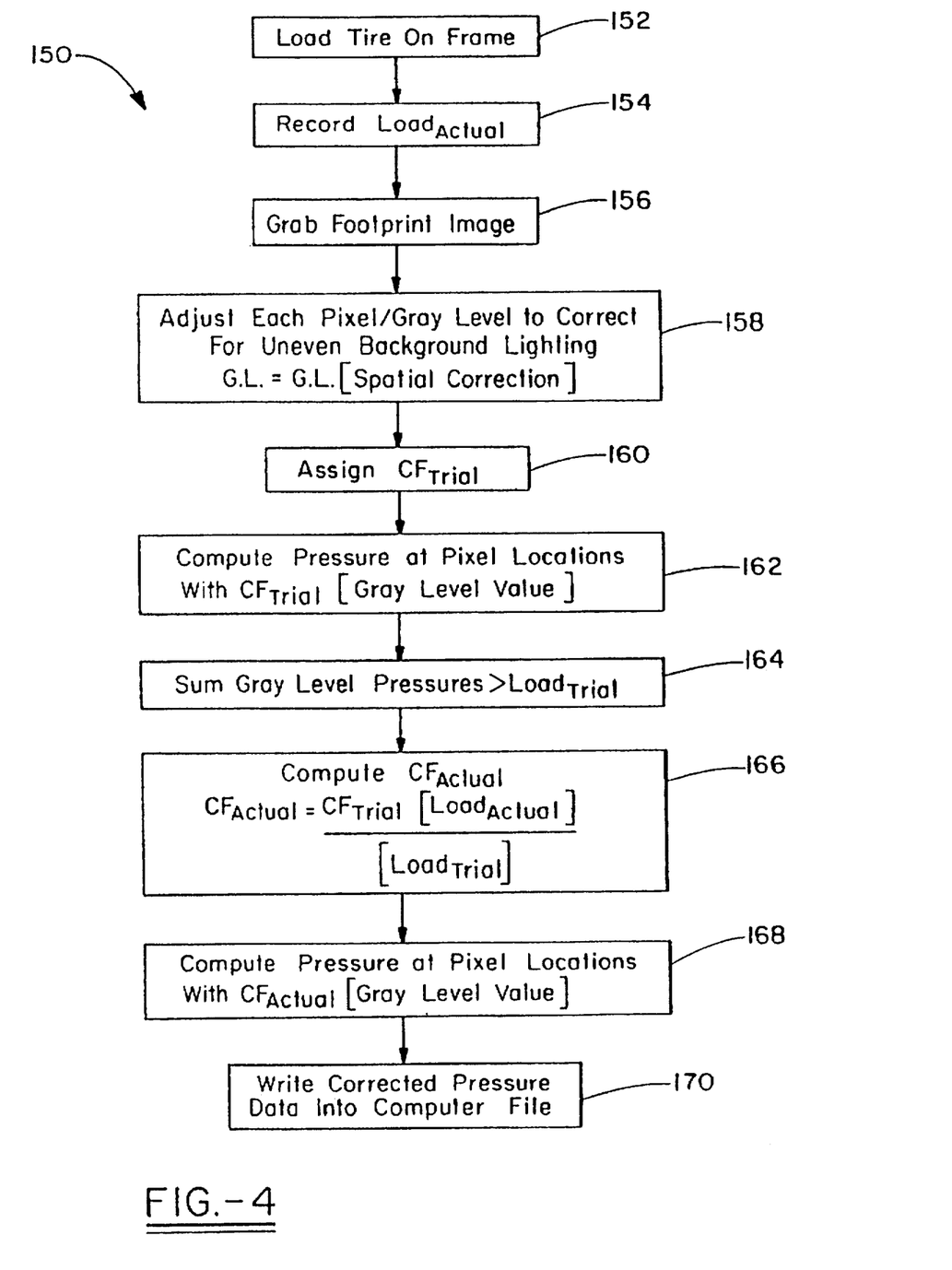
FIG. 4 is a flow chart showing the calibration of the gray-scale image generated by a camera enclosed in a test pod carried by the apparatus.
Figure 5:
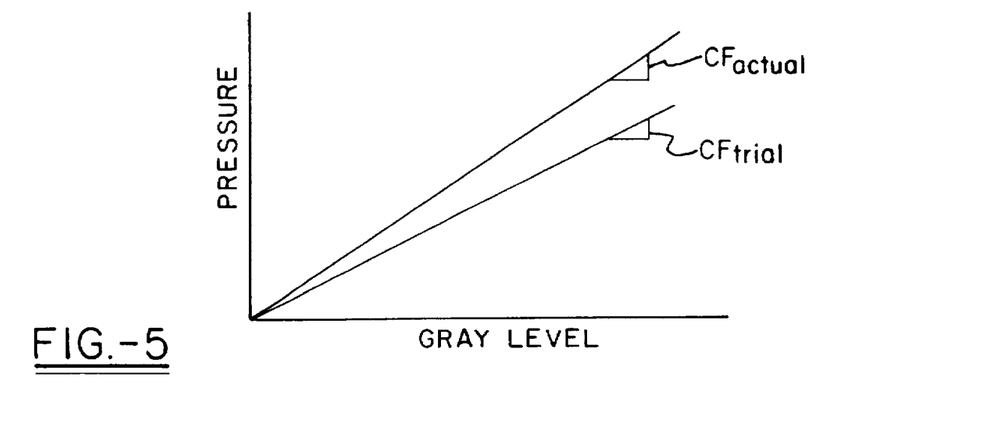
FIG. 5 is a graphical representation of a trial calibration factor and an actual calibration factor.

With reference now to FIGS. 4 and 5, it can be seen that the method of obtaining useful gray-scale images from a tire 11 is designated generally by the numeral 150. As shown, a first step 152 requires that the tire 11 be loaded onto the apparatus 10 and in particular the spindle 94. At step 154, the loading plate 70 couples the tire 11 to the transparent plate 50 with the medium 64 disposed therebetween, whereupon the processor 28 records the actual load value imparted thereby for designation as $LOAD_{ACTUAL}$. At step 156, the camera 60 grabs the foot print image of the tire 11 and transfers this gray-scale image to the processor 28. The processor 28, at step 158, assigns gray level value corrections to each pixel within the foot print image to compensate for uneven background lighting. In other words, light intensity from the lights 54 is not the same intensity at the center of the plate 50 as at the edges of the plate. A predetermined spatial correction factor adjusts each pixel gray level value based upon pixel location with respect to the light intensity to ensure the accuracy of the pressure mapping. The processor 28, at step 160, assigns an arbitrary trial value for the calibration factor ($CF_{TRIAL}$) to compute pressure values from the gray level pixel values. As seen in FIG. 5, there is a corresponding relationship between the gray level values and the pressure values. In other words, the $CF_{TRIAL}$ value is multiplied by the gray value of each pixel to compute a pressure value at each pixel location, as designated in step 162. At step 164, these gray level pressure values are summed over the entire foot print area to derive a $LOAD_{TRIAL}$ value. At step 166, the processor 28 computes an actual calibration factor value ($CF_{ACTUAL}$) by multiplying $CF_{TRIAL}$ times ($LOAD_{ACTUAL}$/$LOAD_{TRIAL}$). At step 168, the processor 28 re-computes the pressure value at each pixel location by multiplying $CF_{ACTUAL}$ times the gray level value of each pixel in the foot print image. This corrected pressure data is then written to the memory within the processor 28 at step 170. The procedure eliminates the need for an independent calibration test to determine $CF_{ACTUAL}$ each time the reflective paper 64 is replaced on the transparent plate 50, thereby saving substantial time and costs. As seen in FIGS. 4 and 5, steps 160–168 generate a linear relation between pressure and gray level. Such a relation has been demonstrated for pressure ranges found in passenger and light truck tires, as well as race tires. As discussed previously, these contact pressure values associated with each pixel are employed in the foot print shape analysis, the foot print pressure mapping and the pressure gradient analysis. Upon collection of the data from a single foot print, the apparatus 10 then rotates the tire 11 to a different position on the tire to collect similar data. This data can then be stored and reviewed at a later time to assist in the design process.

Figure 6:
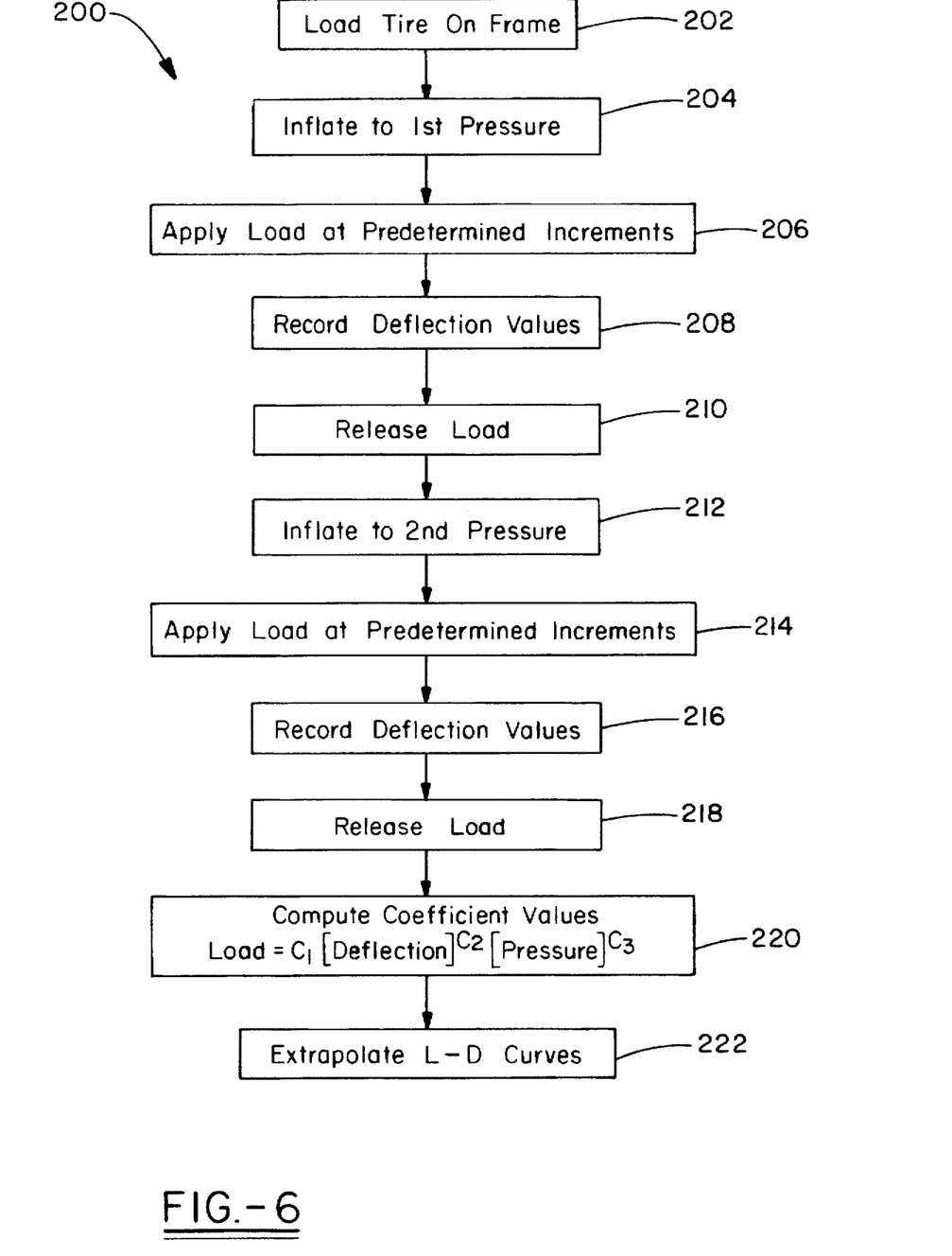
FIG. 6 is a flow chart showing the extrapolation of load-deflection curves from load-deflection curves generated by the test pod.
Figure 7:
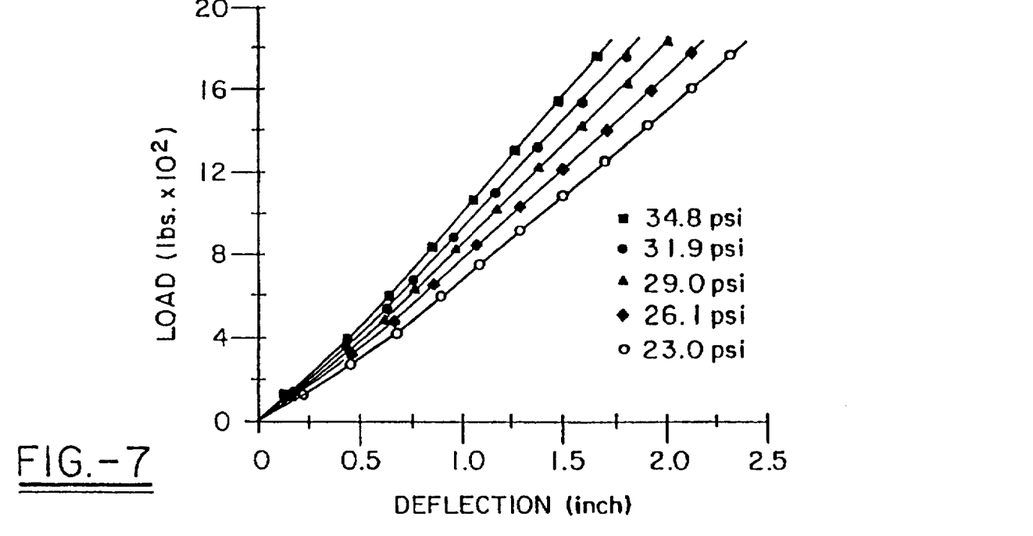
FIG. 7 is a graphical representation of a plurality of load-deflection curves.

With reference now to FIGS. 6 and 7, it can be seen that a method of obtaining load-deflection data from a tire is designated generally by the numeral 200. As shown, a first step 202 requires that the tire 11 be loaded onto the frame 12 in a manner described above. The tire 11 is then inflated by the pressurized air supply 130 to a first inflation pressure at step 204. The loading plate 70, at step 206, couples the tire 11 to the cover plate 52 at predetermined load increments. At step 208, the processor 28 records deflection values from the deflection cell 99 that are associated with the predetermined load increments. At step 210, the processor 28 releases the loading plate 70. At step 212, the processor 28 instructs the pressurized air supply 130 to increase the pressure within the tire to a second inflation pressure. At step 214, the loading plate 70 re-couples the tire 11 to the cover plate 52 at predetermined increments and, at step 216, the processor records the corresponding deflection values. At step 218, the load is released and the tire is dismounted from the apparatus 10. At step 220, the processor 28 computes coefficient values which are employed to determine load-deflection curves at other inflation pressures. Those skilled in the art will appreciate that steps 206 and 208 and steps 212 and 214 collect between 100 to 200 equally spaced measures of load and deflection values over the test. When load-deflection curves at two or more inflation pressures are measured for a tire, a numerical regression analysis of the experimental data points is conducted to provide a "best fit" equation listed below.

$$\text{Load} = C_1 \, (\text{Deflection})^{C_2} \, (\text{Pressure})^{C_3} \qquad (1)$$

It will be appreciated that the coefficients $C_1$, $C_2$ and $C_3$ are coefficients determined by a computer regression analysis implemented by the processor 28. Once the coefficients are determined, load-deflection curves at other inflation pressures can be extrapolated from the above equation, as shown at step 222. By employing the above equation, time is saved and testing costs are reduced. In the preferred embodiment, the first inflation pressure is the minimal value desired from the load-deflection curves and the second inflation pressure is the highest value desired of the load-deflection curves. This ensures the accuracy of the extrapolated load-deflection curves.

It should now be appreciated that an apparatus and related methods have been provided to allow for obtaining a foot print analysis and load-deflection curves, wherein such tests and data are employed to evaluate various tire wear characteristics and performance. The apparatus and methods just described achieve the objects of the invention presented earlier herein and do so in a highly-accurate and efficient manner.

Specifically, the test data can be employed to quickly determine whether a design change is beneficial or detrimental to the performance of a tire. This reduces time spent on the tire design phase and allows bringing a tire to market much quicker than had been previously known.

While in accordance with the patent statutes only the best mode and preferred embodiments of the invention have been presented and described in detail, it is to be understood that the invention is not limited thereto or thereby. Accordingly, for an appreciation of the true scope and breadth of the invention, reference should be made to the following claims.

What is claimed is:

1. Apparatus for testing tires, comprising:
   a frame;
   a loading plate mounted within said frame;
   a tire spindle extending from said loading plate, said tire spindle rotatably receiving a tire to be tested;
   a test pod having a cover plate slidably movable over a transparent plate; and
   a processor for controlling the operation of said loading plate to couple the tire with said cover plate and said transparent plate, said processor being connected to said test pod, wherein said processor and said test pod perform a plurality of tests on the tire.

2. The apparatus according to claim 1, wherein said test pod further comprises:
   a housing carried by said frame,
   said transparent plate and said cover plate carried by said housing, wherein one of said transparent plate and said cover plate is coupled with the tire while said processor performs said plurality of tests.

3. The apparatus according to claim 2, wherein said test pod further comprises:
   a mirror carried in said housing and angularly positioned underneath said transparent plate; and
   at least one camera connected to said processor and positioned to capture an image reflected by said mirror when the tire is coupled to the transparent plate.

4. The apparatus according to claim 3, wherein said camera captures a gray-scale image of the tire coupled to said transparent plate, said gray-scale image having a plurality of pixels each of which has a gray level, said processor calibrating each said gray level to a contact pressure value.

5. The apparatus according to claim 4, wherein said processor utilizes said contact pressure value for each gray level of said plurality of pixels to generate a foot print shape analysis of the tire.

6. The apparatus according to claim 4, wherein said processor utilizes said contact pressure value for each gray level of said plurality of pixels to generate a pressure gradient analysis of the tire.

7. The apparatus according to claim 4, wherein said processor utilizes said contact pressure value for each gray level of said plurality of pixels to generate a foot print pressure mapping.

8. The apparatus according to claim 2, further comprising:
   a load cell coupled to said loading plate and connected to said processor;
   a pressurized air supply coupled to the tire and connected to said processor, said processor monitoring the amount of deflection of said load cell and the inflation pressure of said pressurized air supply when the tire is coupled to said cover plate to generate a load-deflection curve.

9. The apparatus according to claim 8, wherein said processor extrapolates a plurality of load-deflection curves upon generation of at least two load-deflection curves for the tire.

10. The apparatus according to claim 9, wherein said processor determines tire stiffness from said plurality of load-deflection curves.

11. Apparatus for testing tires, comprising:

a frame having a pair of opposed slide tracks;

a loading plate mounted within said frame;

a tire spindle pivotably extending from said loading plate, said tire spindle receiving a tire to be tested;

means for imparting a camber to the tire carried by said spindle;

a motor coupled to said imparting means for selectively rotating said tire spindle and the mounted tire about an axis through a hub of the tire; and a test pod slidably received on said pair of opposed slide tracks, said loading plate coupling the tire to said test pod to generate tire test data.

12. The apparatus according to claim 11, wherein said imparting means comprises:

a turnbuckle coupled between said loading plate and said tire spindle; and a ratchet coupled to said turnbuckle to adjust the length of said turnbuckle and impart a camber angle to said tire spindle.

13. The apparatus according to claim 12, wherein said test pod comprises:

a housing sidably received on said pair of slide tracks;

a transparent plate carried by said housing, said transparent plate having a medium placed thereon, said loading plate coupling the tire to said transparent plate for generating a tire foot print; and a cover plate carried by said housing, wherein said cover plate is sidably movable over said transparent plate, said loading plate coupling the tire to said cover plate is coupled to the tire for generating load-deflection curves.

14. The apparatus according to claim 13, wherein said test pod further comprises:

a mirror carried in said housing and angularly positioned underneath said transparent plate; and at least one camera positioned to capture an image reflected by said mirror when the tire is coupled to said transparent plate, said at least one camera positionable in at least one axis.

15. The apparatus according to claim 14, further comprising:

a load cell coupled to said loading plate;

a pressurized air supply coupled to the tire, wherein the amount of deflection of said load cell and the inflation pressure of said pressurized air supply when the tire is coupled to said cover plate is utilized to generate a load-deflection curve.

16. A method for generating a plurality of load-deflection curves, comprising the steps of:

a) providing a frame which receives a loading plate from which extends a tire spindle that receives a tire;

b) inflating the tire to a first predetermined inflation pressure value;

c) deflecting the tire onto a cover plate to a predetermined load level;

d) measuring a first deflection vs. load curve of the tire;

e) unloading the tire from said cover plate;

f) inflating the tire to a second predetermined inflation pressure value;

g) deflecting the tire onto said cover plate to another predetermined load level;

h) measuring a second deflection vs. load curve of the tire; and i) extrapolating deflection amounts of the tire at other inflation pressure values from said first and second deflection vs. load curves.

17. The method according to claim 16, wherein said other inflation pressure values are between said first and second inflation pressure values.

18. The method according to claim 16 wherein a tire stiffness value is derived from deflection amounts generated in the extrapolating step.

* * * * *